United States Patent
Invernizzi et al.

(10) Patent No.: US 9,816,597 B2
(45) Date of Patent: Nov. 14, 2017

(54) SINTERED PULLEY

(71) Applicants: Mahle Metal Leve Miba Sinterizados Ltda., Sao Paulo (BR); Mahle Metal Leve S/A, Jundiai (BR); Mahle International GmbH, Stuttgart (DE)

(72) Inventors: Reginaldo Invernizzi, Sao Paulo (BR); Daniel A. Perugini, Sao Paulo (BR); Marcelo Woyczak Madeira, Sao Paulo (BR); Ana K. Yasuoka Mizukami, Jundiaí (BR)

(73) Assignees: Mahle Metal Leve Miba Sinterizados Ltda. (BR); Mahle Metal Leve S/A (BR); Mahle International GmbH (DE)

( * ) Notice: Subject to any disclaimer, the term of this patent is extended or adjusted under 35 U.S.C. 154(b) by 0 days.

(21) Appl. No.: 14/981,834

(22) Filed: Dec. 28, 2015

(65) Prior Publication Data

US 2016/0186853 A1    Jun. 30, 2016

(30) Foreign Application Priority Data

Dec. 29, 2014    (BR) .............................. 102014032899

(51) Int. Cl.
| | | |
|---|---|---|
| F16H 55/17 | (2006.01) | |
| F16H 57/00 | (2012.01) | |
| B22F 5/08 | (2006.01) | |
| C22C 33/02 | (2006.01) | |
| F16H 55/06 | (2006.01) | |

(52) U.S. Cl.
CPC ............. *F16H 55/171* (2013.01); *B22F 5/08* (2013.01); *C22C 33/0264* (2013.01); *F16H 55/06* (2013.01); *F16H 57/0025* (2013.01)

(58) Field of Classification Search
CPC ........................... F16H 55/171; F16H 57/0025
See application file for complete search history.

(56) References Cited

U.S. PATENT DOCUMENTS 4,056,014 A * 11/1977 Kraft ..................... B22F 7/06
                                                       29/892
4,059,023 A * 11/1977 Sproul .................. F16H 55/44
                                                       474/170

(Continued)

FOREIGN PATENT DOCUMENTS

| EP | 1500449 A2 | 1/2005 |
|---|---|---|
| WO | WO-97/45219 A1 | 12/1997 |
| WO | WO-99/28070 A1 | 6/1999 |

OTHER PUBLICATIONS

European Search Report for EP Application No. 15198754 dated Apr. 26, 2016.

*Primary Examiner* — William E Dondero
*Assistant Examiner* — Mark K Buse
(74) *Attorney, Agent, or Firm* — Fishman Stewart PLLC

(57) ABSTRACT

A sintered pulley may include a body of a metal alloy and configured with a substantially annular shape. The body may include a first face of contact with a crankshaft, a second face of contact with a securing element, and a concentric hole for associating the pulley with the crankshaft. The second face of contact may have a region of a point of contact with the securing element disposed proximate to the hole. The region of the point of contact may have a density of between 7.3 and 7.5 g/cm$^3$.

20 Claims, 1 Drawing Sheet

(56) References Cited

U.S. PATENT DOCUMENTS

| | | | | |
|---|---|---|---|---|
| 4,090,284 A | * | 5/1978 | Kraft | B22F 7/06 |
| | | | | 29/892.11 |
| 4,952,199 A | * | 8/1990 | Saka | F16H 55/171 |
| | | | | 474/152 |
| 5,476,632 A | * | 12/1995 | Shivanath | C22C 33/0207 |
| | | | | 419/11 |
| 5,729,822 A | * | 3/1998 | Shivanath | B22F 3/1109 |
| | | | | 148/206 |
| 6,110,419 A | * | 8/2000 | Buckley-Golder | B21H 5/022 |
| | | | | 419/28 |
| 6,478,504 B1 | * | 11/2002 | Dawson | F16D 1/0876 |
| | | | | 242/611.2 |
| 2005/0039575 A1 | * | 2/2005 | Fujiki | B22F 5/08 |
| | | | | 75/243 |
| 2014/0100070 A1 | * | 4/2014 | Jung | F16H 55/36 |
| | | | | 474/161 |

* cited by examiner

SINTERED PULLEY

CROSS REFERENCE TO RELATED APPLICATIONS

This application claims priority to Brazilian Patent Application BR 102014032899.8, filed on Dec. 29, 2014, which is hereby incorporated by reference in its entirety.

TECHNICAL FIELD

The present invention relates to a sintered pulley for a crankshaft of an internal combustion engine, the pulley comprising a densified area, that is to say a region of greater density in relation to the initial density of the pulley.

BACKGROUND

Internal combustion engines are energy transformation mechanisms utilized by the vast majority of motor vehicles, basically comprising two principal parts: one or more heads and the engine block. The combustion chambers are located in the base of the head(s) (in Diesel engines in general the combustion chambers are in the piston heads) and the cylinders and the cranked shaft assembly or crankshaft assembly are located in the engine block.

The crankshaft is a fundamental part in the operation of combustion engines, being responsible for transforming the energy generated by the combustion of the air/fuel mixture into torque. Also known as a cranked shaft, the crankshaft is associated with the connecting rods coupled to the pistons, and transmits the moment generated to the other components connected to the extremities of the shaft thereof.

At one extremity of the shaft of the crankshaft there is located the flywheel of the engine, associated with the gearbox. At the other extremity of the shaft there is a pulley responsible for causing the rotation of diverse devices, principally lubrication devices, such as for example hydraulic steering pump, air conditioning pump, water pump, etc.

The pulley utilized on the crankshaft is manufactured by a sintering process and mounted upon the extremity of the shaft by means of a bolt, applying a force required to maintain the assembly secured during the entire working period of the engine. When the bolt is in a system with vibration a deformation may be occasioned on the face of contact of the pulley with the bolt, there occurring compaction of the pulley. This deformation, consequent upon the compaction of the material of the pulley, results in play between the pulley and the bolt, the utilization being necessary of a washer positioned between the pulley and the bolt, normally composed of a conventional steel material comprising a density greater than that of the density of the pulley, eliminating the possibility of compaction of the material.

However, the use of washers to accommodate the play between the pulley and the bolt is extremely undesirable by virtue of the fact that it increases the quantity of components to be utilized in the assembly of the crankshaft, reducing the productivity of the process, and reducing the quality index of the process, by virtue of the fact that the possibility exists of the assemblies being constructed without the washer.

Consequent upon all the aforestated, until the present moment there a pulley had not been developed manufactured by a sintering process and provided with a density such as to confer upon the pulley excellent resistance to the effect of compaction of the material composing it, in this manner preventing the deformation of the pulley and the emergence of play of between the pulley and the securing component.

SUMMARY

The object of the present invention is the provision of a pulley for use upon a crankshaft of an internal combustion engine, the pulley being manufactured by a sintering process whereof at least one region of the pulley is more densified, that is to say a region provided with greater density in relation to the initial density of the pulley.

The present invention has moreover as object the provision of a pulley wherein at least the region of the hole, region of contact with a securing means, be provided with a greater density in relation to the remainder of the body of the pulley.

Furthermore, the present invention has as object the provision of a pulley presenting great resistance to wear in general, being capable of resisting the compaction of the material in the region of contact with the securing means, eliminating deformations and the emergence of play in the securing of the pulley.

The objects of the present invention are achieved by a sintered pulley for a crankshaft of an internal combustion engine, the pulley comprising a body of a metal alloy, the body being substantially annular and provided with a first face of contact with the crankshaft, a second face of contact with a securing element, and a concentric hole for associating the pulley with the crankshaft, the pulley comprising, on the second face of contact, a region substantially adjacent to the hole being the point of contact with the securing element, the region being provided with a density of between 7.3 and 7.5 $g/cm^3$ (grams per cubic centimeter).

The objects of the present invention are furthermore achieved by an internal combustion engine comprising at least one pulley as aforedescribed.

BRIEF DESCRIPTION OF THE DRAWINGS

The present invention shall be described below in greater detail based upon an example of embodiment shown in the drawings. The figures represent.

DETAILED DESCRIPTION

Figure 1:
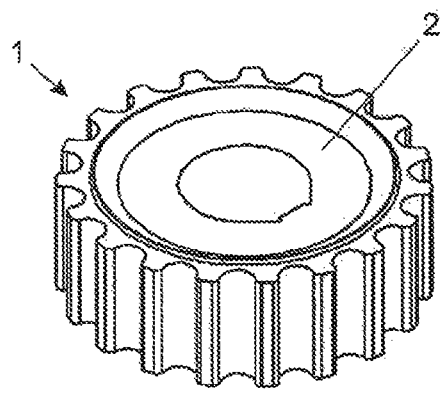
FIG. 1, a perspective view of the pulley of the present invention.

The present invention relates to a sintered pulley 1 for a crankshaft of an internal combustion engine, the pulley 1 comprising a body 2 of a metal alloy, the body 2 being substantially annular provided with a first face of contact 10 with the crankshaft 3, a second face of contact 11 with a securing element 4 and a concentric hole 12 for association of the pulley 1 with the crankshaft 3, the pulley comprising, on the second face of contact 11, a region 13 substantially adjacent to the hole 12 and point of contact with the securing element 4, the region 13 being provided with a density of between 7.3 and 7.5 $g/cm^3$ (grams per cubic centimeter) such as to ensure great wear resistance, preventing possible deformations generated through the compaction of the material of the pulley 1, precluding the emergence of play in the securing of the pulley 1.

For the correct comprehension of the present invention an initial clarification is necessary in terms of the association of the pulley 1 with the crankshaft 3 and in terms of the sintering process utilized in the manufacture of the pulley 1.

As explained in the state of the art, crankshaft 3 is a fundamental part in the operation of combustion engines, responsible for transforming the energy generated by the combustion of the air/fuel mixture into torque. Known also as a cranked shaft, the crankshaft 3 is associated with the connecting rods coupled to the pistons and transmits the moment generated to the other components connected to the extremities of the shaft thereof.

At one extremity of the shaft of the crankshaft 3 is the flywheel of the engine, associated with the gearbox. At another extremity of the shaft there is a pulley 1 responsible for causing the rotation of diverse devices, principally lubrication devices, such as for example hydraulic steering pump, air conditioning pump, water pump, etc.

The pulley 1 is manufactured by a sintering process and is associable with one of the extremities of the shaft of the crankshaft 3 by means of a securing element, the securing element 4 being preferably, but not obligatorily, a bolt.

Figure 2:
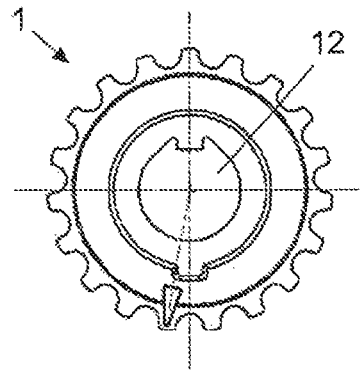
FIG. 2, a frontal view of the pulley of the present invention.

In this manner, the pulley 1 of the present invention comprises a body 2 composed of a metal alloy, the body 2 being substantially annular and provided with a first face of contact 10 maintaining direct contact with one face of the crankshaft 3, and a second face of contact 11 maintaining contact with the securing element 4, in this specific case the securing element 4 being a bolt. The pulley 1 is furthermore provided with a concentric hole 12 for association of the pulley 1 with the crankshaft 3. In this manner there is presented an assembly of crankshaft 3, pulley 1 and securing element 4 (see FIGS. 1 and 2).

In order to ensure that the aforedescribed assembly is maintained secured during the entire working period of the engine a force is applied to the securing element 4 necessary to ensure such condition. When the securing element 4 is in a system with vibration, in this case the engine in operation, a deformation may occur on the second face of contact 11, there occurring the compaction of a region 13 adjacent to the hole 12 and point of contact with the securing element 4. This deformation, consequent upon the compaction of the material of the pulley 1, results in play between the pulley 1 and the securing element 4.

Such compaction occurs by virtue of the low density of the material of the pulley 1, originating from a sintering process. The sintering, also known as powder metallurgy, arises from a process wherein powders having, or not, a crystalline preparation are compacted and subsequently subjected to high temperatures, slightly lower than the melting temperature thereof, adhesion of the particles of the powders occurring.

The pulley 1 of the present invention is composed of a metal alloy with up to 0.5% by volume of carbon (C), between 1% and 5% by volume of copper (Cu), between 1% and 5% by volume of nickel (Ni), up to 2% by volume of molybdenum (Mo), up to 2% by volume of other materials such as phosphorus (P), manganese (Mn) and sulfur (S), the remainder, approximately 94% by volume, being of iron (Fe).

The sintering process presents innumerable advantages compared with other methods of working, such as for example the reduction in, or even the elimination of, reworking of the part produced, the reduction in material losses, the utilization of a great variety of raw materials, the production of parts having good surface finish, facility in the manufacture of complex parts, etc.

However, in the case of the pulley 1, the material suffers a further compaction resulting from the deformation of the pores of the second face of contact 11, generating play in the securing of the pulley 1 to the crankshaft 3.

Figure 3:
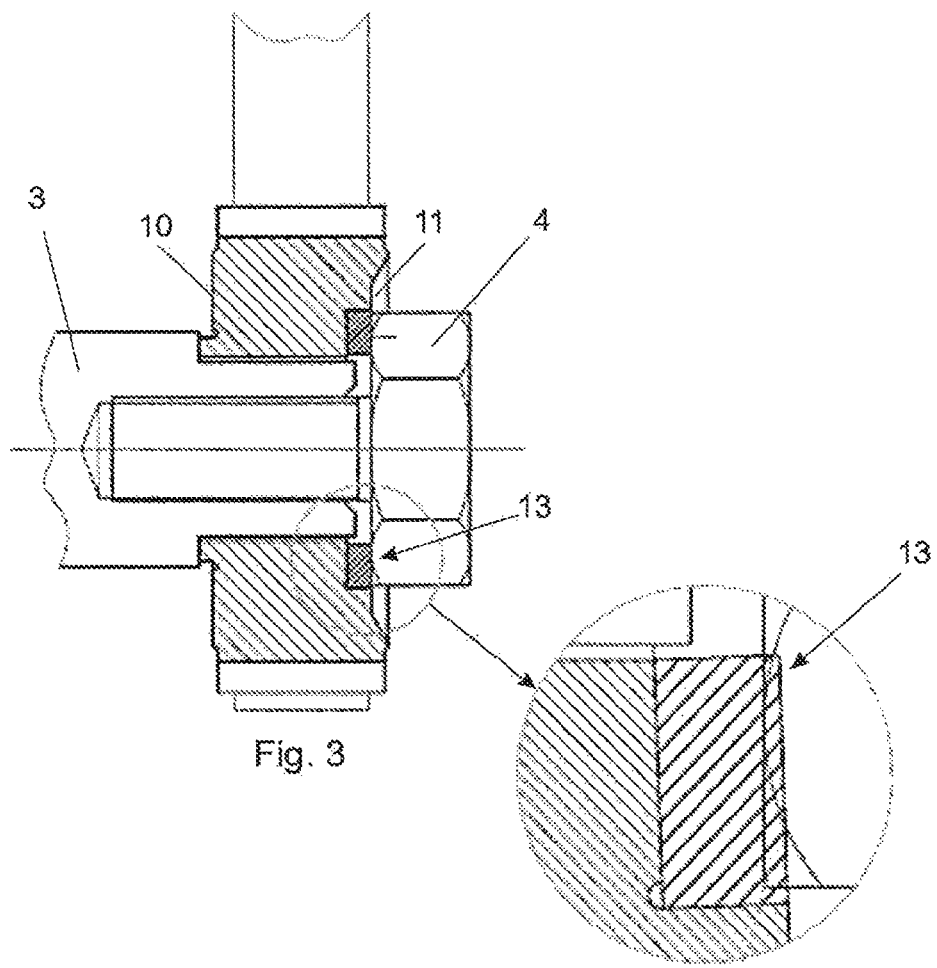
FIG. 3, a side view of the assembly of crankshaft, pulley and securing element.
Figure 4:
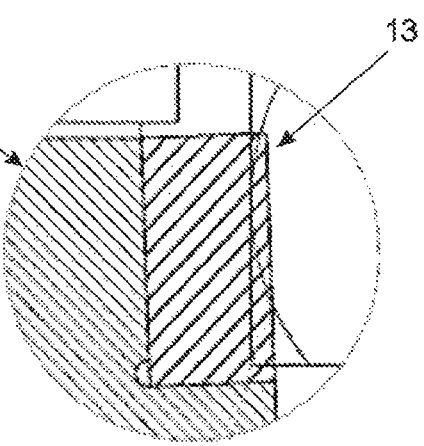
FIG. 4, a detailed drawing of the densified region of the pulley of the present invention.

In this sense, the present invention presents, in FIGS. 3 and 4, a pulley 1 comprising a region 13 adjacent to the hole 12 and point of contact with the securing element 4, the region 13 being provided with a density of between 3% to 5% greater in relation to the density of the remainder of the pulley 1, attaining approximately the density of conventional steel of 7.85 g/cm$^3$. In this manner, the region 13 comprises a density of between 7.3 and 7.5 g/cm$^3$ (grams per cubic centimeter), whilst the remainder of the pulley 1 comprises a density of between 6.7 and 7.2 g/cm$^3$.

According to that described in the state of the art, washers are currently utilized to accommodate the play existing between the pulley 1 and the securing element 4, the utilization of washers however being highly undesirable. Such difficulty is avoided through the densification of the region 13 of the pulley 1.

In summary, the pulley 1 of the present invention presents in the region 13 mechanical properties sufficient to minimize or eliminate the emergence of play through the unplanned compaction of the material of the pulley 1 due to the low density in relation to the conventional steel.

It is placed on record that diverse tests have been carried out in the sense of encountering the optimum ratio between the quantity of material to be added, in consideration of the total height of the pulley, in the region 13, in the second face of contact 11 and in the diameter of the hole 12, the optimum ratio being encountered as lying between 5% and 20%, preferably 10%, of additional material in the region 13 in relation to the second face of contact 11 and the hole 12.

Furthermore, with reference to the angles and other geometries of the solution, these serve solely to prevent puncture ruptures, together with preventing the material to be deformed migrating excessively in the direction of the central hole of the part, losing the final dimensions thereof.

The pulley 1 of the present invention promotes productivity gains, reducing the time for constructing the assembly of the crankshaft 3, pulley 1 and the securing element 4, in addition to moreover reducing the number of components for the construction of the assembly, eliminating the use of washers to accommodate play.

The invention furthermore renders possible an increase in the quality index of the production, by virtue of the fact that it prevents the assemblies being constructed without washers as a consequence of it eliminating the utilization of the same.

An example of preferred embodiment having been described, it shall be understood that the scope of the present invention covers other possible variations, being limited solely by the content of the appended claims, therein included the possible equivalents.

The invention claimed is:

1. A sintered pulley for a crankshaft of an internal combustion engine, comprising: a body of a metal alloy, the body being substantially annular and including a first face of contact with the crankshaft, a second face of contact with a securing element, and a concentric hole for association of the pulley with the crankshaft, wherein the second face of contact has a region of a point of contact with the securing element disposed proximate to the hole, the region of the point of contact including an additional material deposit extending at least one of partially inward from the second face of contact in an axial direction and partially along the body in a radial direction, and wherein the region of the point of contact has a density greater than a density of the body in a region spaced away from the region of the point of contact, the density of the region of the point of contact ranging between 7.3 and 7.5 g/cm$^3$.

2. The sintered pulley according to claim 1, wherein the region of the point of contact includes between 5% and 20% of the additional material deposit in relation to a quantity of material of at least one of the second face of contact and of the hole.

3. The sintered pulley according to claim 2, wherein the body includes a composition of the following materials: up to 0.5% by volume of carbon; between 1% and 5% by volume of copper; between 1% and 5% by volume of nickel; up to 2% by volume of molybdenum; up to 2% by volume of at least one element including phosphorus, manganese and sulfur, and a remainder of iron.

4. The sintered pulley according to claim 3, wherein the remainder of iron is approximately 94% by volume.

5. The sintered pulley according to claim 1, wherein the region of the point of contact includes 10% of the additional material deposit in relation to a quantity of material of at least one of the second face of contact and of the hole.

6. The sintered pulley according to claim 1, wherein the body is composed of up to 0.5% by volume of carbon (C), between 1% and 5% by volume of copper (Cu), between 1% and 5% by volume of nickel (Ni), up to 2% by volume of molybdenum (Mo), up to 2% by volume of at least one material including at least one of phosphorus (P), manganese (Mn) and sulfur (S), and the remainder of approximately 94% by volume of iron (Fe).

7. The sintered pulley according to claim 1, wherein the securing element is a bolt at least partially arranged in the hole.

8. The sintered pulley according to claim 1, wherein the region of the point of contact is disposed adjacent to and surrounds the hole.

9. The sintered pulley according to claim 1, wherein the density of the region of the point of contact is between 3% and 5% greater than the density of the body in the region spaced away from the region of the point of contact.

10. The sintered pulley according to claim 1, wherein the density of the body in the region spaced away from the region of the point of contact is between 6.7 and 7.2 g/cm$^3$.

11. An internal combustion engine, comprising: at least one sintered pulley operatively associated with a crankshaft, the at least one pulley including:
a body composed of a metal alloy and configured in an annular shape, wherein the body includes:
a first contact face in contact with the crankshaft;
a second contact face in contact with a securing element; and
a concentric hole receiving at least one of the crankshaft and the securing element;
wherein the second contact face has a region of a point of contact with the securing element surrounding the hole;
wherein the region of the point of contact includes an additional material deposit that extends at least one of partially inward from the second face of contact in an axial direction and partially along the body in a radial direction; and
wherein the region of the point of contact has a density greater than a density of the body in a region spaced away from the region of the point of contact, the density of the region of the point of contact ranging between 7.3 and 7.5 g/cm$^3$.

12. The internal combustion engine according to claim 11, wherein the additional material deposit is between 5% and 20% greater than a quantity of material of at least one of the second contact face and the hole.

13. The internal combustion engine according to claim 12, wherein the securing element is a bolt in contact with the region of the point of contact and received by the crankshaft.

14. The internal combustion engine according to claim 11, wherein the additional material deposit that is 10% greater than a quantity of material of at least one of the second contact face and the hole.

15. The internal combustion engine according to claim 11, wherein the body includes a composition of the following materials: up to 0.5% by volume of carbon; between 1% and 5% by volume of copper; between 1% and 5% by volume of nickel; up to 2% by volume of molybdenum; up to 2% by volume of at least one element including phosphorus, manganese and sulfur, and a remainder of iron.

16. The internal combustion engine according to claim 15, wherein the remainder of iron is approximately 94% by volume.

17. The internal combustion engine according to claim 11, wherein the securing element is a bolt.

18. The internal combustion engine according to claim 11, wherein the density of the body of the pulley in the region spaced away from the region of the point of contact is between 6.7 and 7.2 g/cm$^3$.

19. The internal combustion engine according to claim 11, wherein the density of the region of the point of contact is between 3% and 5% greater than the density of the body in the region spaced away from the region of the point of contact.

20. A sintered pulley for a crankshaft of an internal combustion engine, comprising: a body composed of a metal alloy and configured in an annular shape, wherein the body includes:
a first contact face in contact with the crankshaft;
a second contact face in contact with a securing element;
a concentric hole receiving at least one of the crankshaft and the securing element;
wherein the second contact face has a region of a point of contact with the securing element bordering the hole, and wherein the region of the point of contact has a density of between 7.3 and 7.5 g/cm$^3$, the density of the region of the point of contact being at least 3% greater than a density of the remainder of the body; and
wherein the region of the point of contact includes an additional material deposit that is between 5% and 20% greater than a quantity of material of at least one of the second contact face and the hole, the additional material deposit extending inward from the second face of contact in an axial direction and partially along the second face of contact in a radial direction.

\* \* \* \* \*